United States Patent
Le Mer

(10) Patent No.: US 11,079,137 B2
(45) Date of Patent: Aug. 3, 2021

(54) CONDENSATION HEAT EXCHANGER PROVIDED WITH A HEAT EXCHANGE DEVICE

(71) Applicant: SERMETA, Morlaix (FR)

(72) Inventor: Joseph Le Mer, Plouezoch (FR)

(73) Assignee: SERMETA, Morlaix (FR)

( * ) Notice: Subject to any disclaimer, the term of this patent is extended or adjusted under 35 U.S.C. 154(b) by 239 days.

(21) Appl. No.: 16/071,479

(22) PCT Filed: Jan. 16, 2017

(86) PCT No.: PCT/EP2017/050833
§ 371 (c)(1),
(2) Date: Jul. 19, 2018

(87) PCT Pub. No.: WO2017/125361
PCT Pub. Date: Jul. 27, 2017

(65) Prior Publication Data
US 2019/0024942 A1 Jan. 24, 2019

(30) Foreign Application Priority Data
Jan. 22, 2016 (FR) ...................................... 1650529

(51) Int. Cl.
F24H 1/43 (2006.01)
F24H 8/00 (2006.01)
(Continued)

(52) U.S. Cl.
CPC ................. F24H 1/43 (2013.01); F24H 1/40 (2013.01); F24H 8/00 (2013.01); F28D 7/005 (2013.01);
(Continued)

(58) Field of Classification Search
CPC ..... F24H 1/40; F24H 1/43; F24H 8/00; F28D 7/005; F28D 7/08; F28D 9/00;
(Continued)

(56) References Cited

U.S. PATENT DOCUMENTS 3,051,146 A * 8/1962 Clarkson .................. F22B 21/26
122/249
3,841,273 A * 10/1974 Finger ....................... F24H 1/43
122/248

(Continued)

FOREIGN PATENT DOCUMENTS

DE 4309598 A1 9/1994
EP 1251319 A2 10/2002
(Continued)

OTHER PUBLICATIONS

Preliminary Research Report received for French Application No. 1650529, dated Sep. 15, 2016, 3 pages (1 page of French Translation Cover Sheet and 2 pages of original document).
(Continued)

Primary Examiner — Steven B McAllister
Assistant Examiner — Benjamin W Johnson
(74) Attorney, Agent, or Firm — Womble Bond Dickinson (US) LLP

(57) ABSTRACT

The invention relates to a condensation heat exchanger which comprises: —at least two concentric bundles (5, 5') of tubes made from a material that is a good thermal conductor, inside which tubes a heat-transfer fluid is intended to circulate, each bundle of tubes (5, 5') comprising a series of tubes (50, 50') in the form of an arc of a circle, the tubes of each bundle (5, 5') being arranged in parallel planes with a gap (53, 53') between two adjacent tubes (50, 50'), —a single collector (6) made of a material that is a good conductor of heat and to which the two ends (51, 51', 52, 52') of each tube (Continued)

Figure 1:
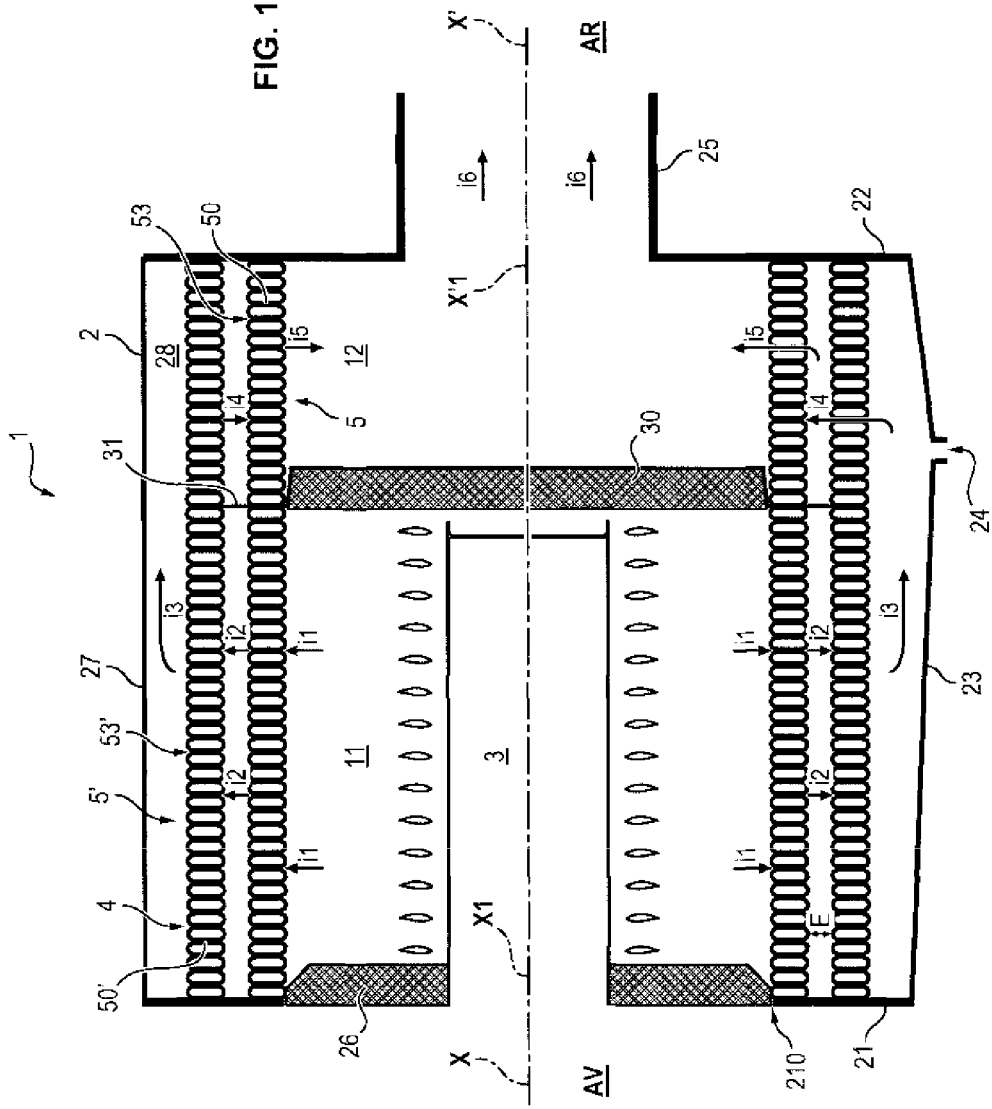

(50, 50') of the various bundles (5, 5') are connected, this collector (6) being equipped with inlet (61) and outlet (62) couplings. This exchanger is notable in that the collector (6) comprises several partitions delimiting various channels, which allow the fluid that is to be warmed up to be made to circulate in the various successive bundles from the outermost bundle to the innermost bundle.

18 Claims, 12 Drawing Sheets

(51) Int. Cl.
| | |
|---|---|
| *F28F 9/02* | (2006.01) |
| *F28D 7/00* | (2006.01) |
| *F28D 7/08* | (2006.01) |
| *F24H 1/40* | (2006.01) |
| *F28D 9/00* | (2006.01) |
| *F28D 7/02* | (2006.01) |
| *F28F 9/22* | (2006.01) |
| *F28D 21/00* | (2006.01) |

(52) U.S. Cl.
CPC .............. *F28D 7/022* (2013.01); *F28D 7/08* (2013.01); *F28D 9/00* (2013.01); *F28F 9/02* (2013.01); *F28F 9/0202* (2013.01); *F28F 9/0204* (2013.01); *F28F 9/22* (2013.01); *F28D 2021/0024* (2013.01); *Y02B 30/00* (2013.01)

(58) Field of Classification Search
CPC .............. F28D 2021/0024; F28D 7/022; F28F 9/0202; F28F 9/02; F28F 9/0204; F28F 9/22; Y02B 30/102; Y02B 30/00
USPC ....................................................... 122/18.4
See application file for complete search history.

(56) References Cited

U.S. PATENT DOCUMENTS

| | | | | |
|---|---|---|---|---|
| 4,007,712 | A | * | 2/1977 | Finger ..................... F22B 27/08 |
| | | | | 122/250 R |
| 5,546,760 | A | * | 8/1996 | Cook .................... F25B 15/008 |
| | | | | 62/497 |
| 6,644,393 | B2 | | 11/2003 | Roberts et al. |
| 6,810,836 | B1 | | 11/2004 | Ferguson et al. |
| 2003/0192684 | A1 | * | 10/2003 | Roberts ..................... F28D 7/08 |
| | | | | 165/163 |
| 2005/0120981 | A1 | | 6/2005 | Ferguson et al. |

FOREIGN PATENT DOCUMENTS

| | | |
|---|---|---|
| EP | 1813882 A1 | 8/2007 |
| EP | 2157382 A2 | 2/2010 |
| WO | 94/16272 A1 | 7/1994 |
| WO | 2004/036121 A1 | 4/2004 |

OTHER PUBLICATIONS

International Search Report and Written Opinion received for PCT Patent Application No. PCT/EP2017/050833, dated May 11, 2017, 22 pages (10 pages of English Translation and 12 pages of Original Document).

International Preliminary Report on Patentability received for PCT Patent Application No. PCT/EP2017/050833, dated Aug. 2, 2018, 18 pages (9 pages of English Translation and 9 pages of Original Document).

* cited by examiner

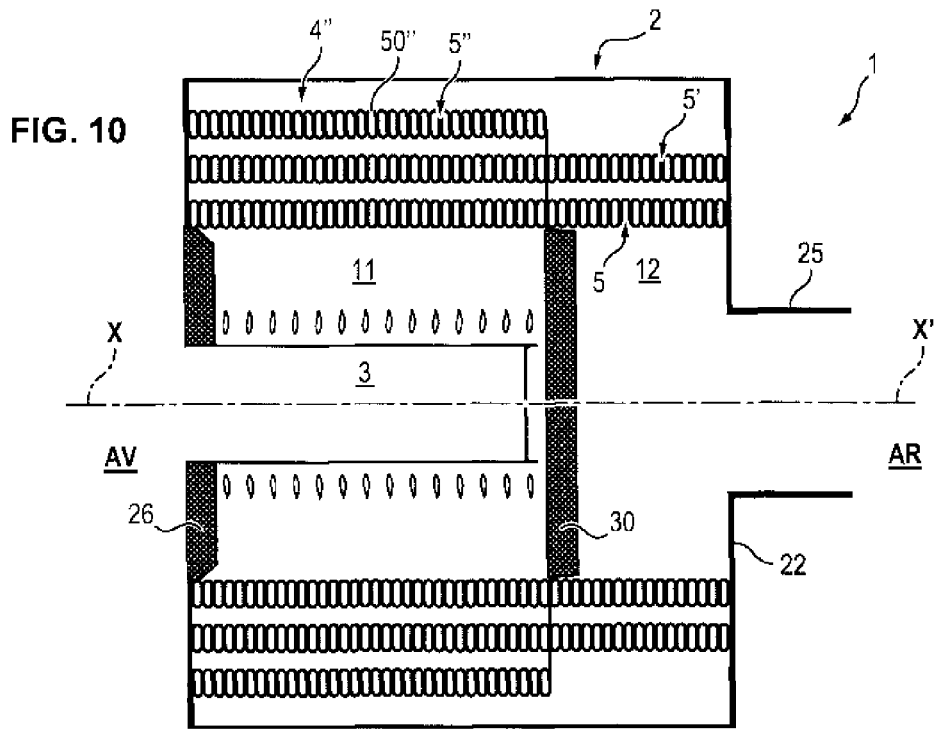
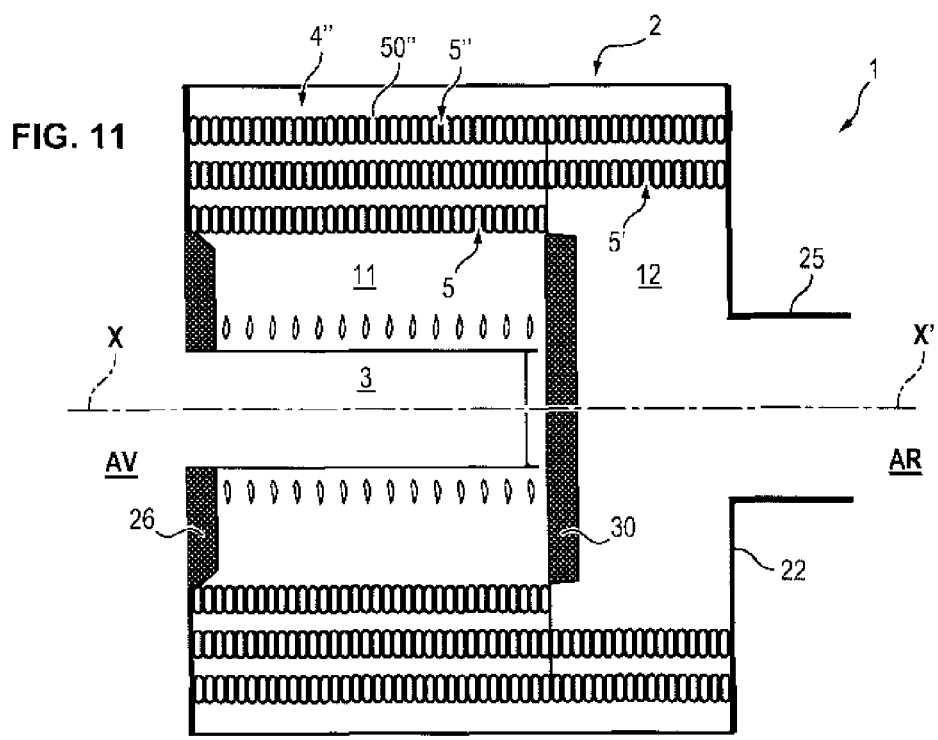

CONDENSATION HEAT EXCHANGER PROVIDED WITH A HEAT EXCHANGE DEVICE

GENERAL TECHNICAL FIELD

The present invention relates to a condensation heat exchanger, provided with a heat exchange device.

Such an exchanger is designed to equip a gas or fuel oil heater for industrial or tertiary applications, for the purpose of supplying for example a central heating circuit or a sanitary water circuit.

PRIOR ART

Already known in the prior art are numerous exchangers allowing fuel energy to be transferred to a fluid to be heated.

Heat exchangers provided with stainless steel tubes operating according to two principles share most of the heating and sanitary hot water production market. These are fire tube exchangers and water tube exchangers, so called depending on the fluid which circulates inside said tubes.

Exchangers called "fire tube" generally have a large water capacity. They are therefore bulky and very heavy. In addition, their design confers on them a strong inertia with regard to the need for rapid variations of temperature and power which are required for the applications considered.

Exchangers called "water tube" generally have a small water capacity. They are less bulky, less heavy and also allow a more rapid variation in temperature and power. Finally, their manufacturing cost to obtain the same nominal power is generally smaller than that of fire tube exchangers.

It remains desirable, however, to further improve existing water tube condensation heat exchangers on the market.

Already known from U.S. Pat. No. 6,644,393 is a heat exchanger comprising a heat exchange device and a gas burner.

The heat exchange device comprises a collector and two radially concentric bundles of tubes, each bundle of tubes comprising a series of circular arc shaped tubes, disposed in parallel planes with a gap between them. The two ends of each circular arc tube lead into the interior of the collector. The gas burner is disposed in the center of the interior bundle and the hot gases produced allow the tubes, and consequently the water which circulates inside them, to be heated.

In addition, the collector is provided with a removable cover and, in its interior, with a barrier which is also removable, which allows, after removal of the cover and of the barrier, easy access to the ends of the tube which lead into said collector and to thus solve the technical problem of cleaning said tubes.

Figure 6:
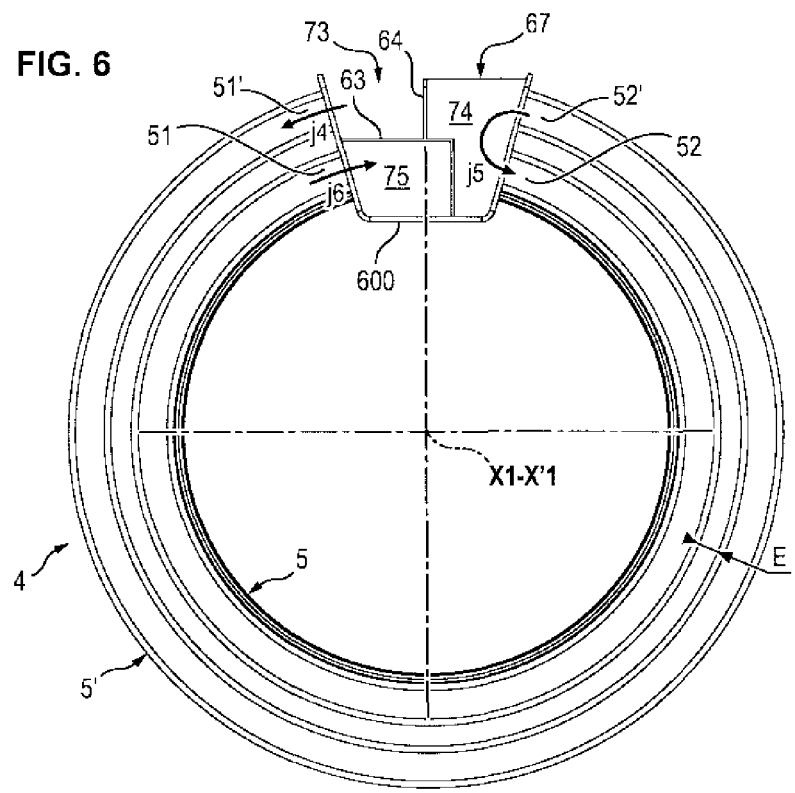

As can be seen in FIG. 6 of this document, the barrier is configured so that the entering flow of water (IN arrow) simultaneously supplies half the tubes of the interior bundle and half the tubes of the exterior bundle. At the outlet of these tubes, the two flows are mixed, then directed to the other half of the bundles to feed, again simultaneously, the tubes of the interior bundle and those of the exterior bundle.

Such a device has a major disadvantage, however.

The water (IN arrow) enters at the same temperature into the two bundles, interior and exterior, then the water that circulates in the tubes of the interior bundle is heated to a higher temperature than that circulating in the tubes of the exterior bundle (first pass). The two flows are mixed, their temperature is averaged, then this flow penetrates simultaneously into the second half of the interior bundle and the exterior bundle (second pass).

At the outlet of the collector, the two flows are mixed (OUT arrow) and the temperature of the departing flow corresponds to the average of the two water flows originating respectively in the interior bundle and in the exterior bundle.

Consequently, of it was desired for example to produce water at 50° C. from water at 30° C. with such a device, the water leaving after the second pass from the tubes of the interior bundle would need to be at approximately 55° C. and that leaving the tubes of the exterior bundle at approximately 45° C. to obtain an average of 50° C. after mixing the two flows. The water circulating in the interior bundle would therefore be heated more than necessary. Moreover, the hot gases produced by the central burner and which are at approximately 1000° C. would cool less in contact with the tubes of the interior bundle wherein water at 55° C. circulates. They would leave the device at a relatively elevated temperature which can be estimated on the order of 80° C. These cooled gases would therefore be at a temperature higher than the dew point (equal to 55° C.) and would not condense. Such a heat exchanger would therefore offer poor energy efficiency; pollutant emissions ($NO_x$, CO and $CO_2$) would be higher.

Likewise, if it was desired for example to produce water at 95° C. from water at 80° C. with such a device, it would be necessary for the water leaving the tubes of the interior bundle to be at approximately 105° C. and that leaving the tubes of the exterior bundle at approximately 85° C. to obtain an average of 95° C. after mixing the two flows. In this case a boiling phenomenon would be observed in at least a portion of the tubes of the interior bundle, which is prohibitive for heating applications because it causes thermal loading of the inner surface of the tubes beyond normal operating conditions, causing a minima, noise, rattling and deterioration of the tubes until rupture.

Finally, this device also has other disadvantages. If sealing is not perfect when the cover and the removable barrier are installed, parasitic turbulence phenomena, head loss and mixture of different water flows inside the device appear, which causes phenomena of disparity in water flow rates in the tubes and therefore the appearance of boiling phenomena in these tubes.

PRESENTATION OF THE INVENTION

The invention has as its objective to propose a condensation heat exchanger which:

allows condensation thermal efficiency attaining the maximum with respect to the laws of physics.

allows head losses inside the water circuit to be strongly limited, has an extremely modular design, so as to allow power ranges to be obtained extending from a few tens to a several thousand kilowatts, which still using a single burner of which the power is adapted as required, has a reduced power/bulk/weight ratio and therefore a lower cost than heat exchangers operating according to other concepts, allows the assembly of tubes by other means than brazing, thus contributing greater longevity to the exchanger.

To this end, the invention relates to a condensation heat exchanger, comprising:

a gas-tight shell, delimiting a combustion chamber and having a gas discharge coupling, a heat exchange device wherein a heat-transfer fluid to be heated, such as water, is designed to circulate, this device being mounted fixedly in the interior of the combustion chamber of said shell, means for conveying hot gases or means for producing hot gases in the combustion chamber of said shell, said heat exchange device comprising:

a first tube bundle, called "interior" and at least one other tube bundle, disposed concentrically around the first, these different tubes being made of a material with good thermal conductivity and said heat-transfer fluid being designed to circulate inside them, each bundle of tubes comprising a series of tubes, each of which is shaped as a circular arc and has a first end and a second end, the tubes of each bundle being disposed in parallel planes with a gap, preferably of constant width, between two adjacent tubes, a single collector, made of material with a good thermal conductivity, delimited by walls, the first end and the second end of each tube of the different bundles being connected to this collector, so that they lead into the interior of said collector, this collector being provided with an inlet connector allowing it to be supplied with heat-transfer fluid to be heated, and with an outlet collector allowing the discharge of said fluid once heated, said means of conveying or said means of producing hot gases (3) being disposed in the vicinity of said heat exchange device, so that these hot gases pass radially through the different concentric tube bundles, for the interior to the exterior, by passing in the gaps provided between said tubes, before being discharge at the exterior of the exchanger, through said discharge coupling, In conformity with the invention, said collector comprises several interior partitions welded to each other and/or to the walls of the collector, and in that these partitions delimit different channels, including:

at least one channel allowing said inlet connector to be put into communication with the first or the second ends of at least one group of at least two tubes, exclusively of the outermost bundle, and at least one channel allowing the first or second ends of at least one group of at least two tubes, exclusively of the interior bundle, to be put into communication with said outlet connector, the different channels being arranged so as to cause the fluid to be heated to circulate from said inlet connector, through the set of tubes or the different groups of at least two tubes of each successive bundle, successively, bundle by bundle, from the outermost bundle to the interior bundle, then discharging said fluid once heated through said outlet connector (62).

Thanks to these features of the invention, it is possible to obtain strong heating of the heat-transfer fluid with strong cooling of the gases, and therefore maximum energy efficiency, all with a particularly compact device. In addition, the fact of causing the fluid to circulate in parallel in all the tubes of a same group of tubes allows head losses to be limited.

Finally, the fact that the collector is made of a material with good thermal conductivity further increase heat exchange.

According to other advantageous and non-limiting features of the invention, taken alone or in combination:

the collector comprises a bottom, an exterior wall, a rear wall, a front wall and two lateral walls through which the first and the second ends of the tubes of the different bundles lead into the interior of the collector, and these lateral walls extend in radial planes of a cylinder the longitudinal axis of which passes through the center of the circles of the different circular-arc-shaped tubes, the tubes of said bundles have a flattened oval straight section so that they comprise two mutually parallel lateral flat faces perpendicular to the longitudinal axis joining the centers of the circles of the circular-arc-shaped tubes, the partitions which constitute the different channels extend in the collector longitudinally, transversely and/or diagonally, the partitions which constitute the different channels extend over a portion or over the totality of the height, of the width and of the length of the collector, the partitions which constitute the different channels are curved, the gaps between two adjacent tubes of the different bundles are calibrated by means of spacers, preferably, said spacers are bosses or corrugations, formed in the wall of a tube, facing the wall of an adjacent tube of the same bundle, the exchanger comprises means for causing said heat-exchange fluid to circulate in the tubes, the means of producing hot gases are a gas or fuel oil burner.

The invention also relates to a heat exchange device, for condensation heat exchange, comprising:

at least two bundles of tubes made of material with good thermal conductivity, inside which a heat-exchange fluid such as water is designed to circulate, each bundle of tubes comprising a series of tubes each of which has a circular arc shape and has a first end and a second end, the tubes of each bundle being disposed in parallel planes with a gap, preferably with constant width, between two adjacent tubes, the different tube bundles being disposed concentrically, a single collector made of material with good thermal conductivity to which are connected the first end and the second end of each tube of the different bundles, so that these different ends lead into the interior of said collector, this collector being provided with an inlet connector allowing it to be supplied with heat-exchange fluid to be heated, and an outlet collector allowing the discharge of said fluid once heated and comprising several interior partitions delimiting different channels, each channel allowing the first or the second ends of at least one group of at least two tubes of at least one bundle to be put into communication either with said inlet connector, or with said outlet connector, or with the first or second ends of at least one group of at least two tubes of the same bundle or another bundle, the channels being arranged to allow the passage of the fluid to be heated in the tube assembly from the inlet connector to the outlet connector.

The invention also relates to a condensation heat exchanger, associated with conveying means or production means for hot gasses, this exchanger comprising at least one heat exchange device as mentioned previously, wherein a heat-exchange fluid, such as water, is designed to circulate, said heat exchange device being disposed in the vicinity of said hot gas conveying means or said hot gas producing means, in such a position that said hot gases pass into the gaps separating the tubes of said heat exchange device.

PRESENTATION OF THE FIGURES

Other features and advantages of the invention will appear from the description which will now be given, with reference to the appended drawings, which represent, by way of indication and without limitation, several possible embodiments of it.

Figure 2:
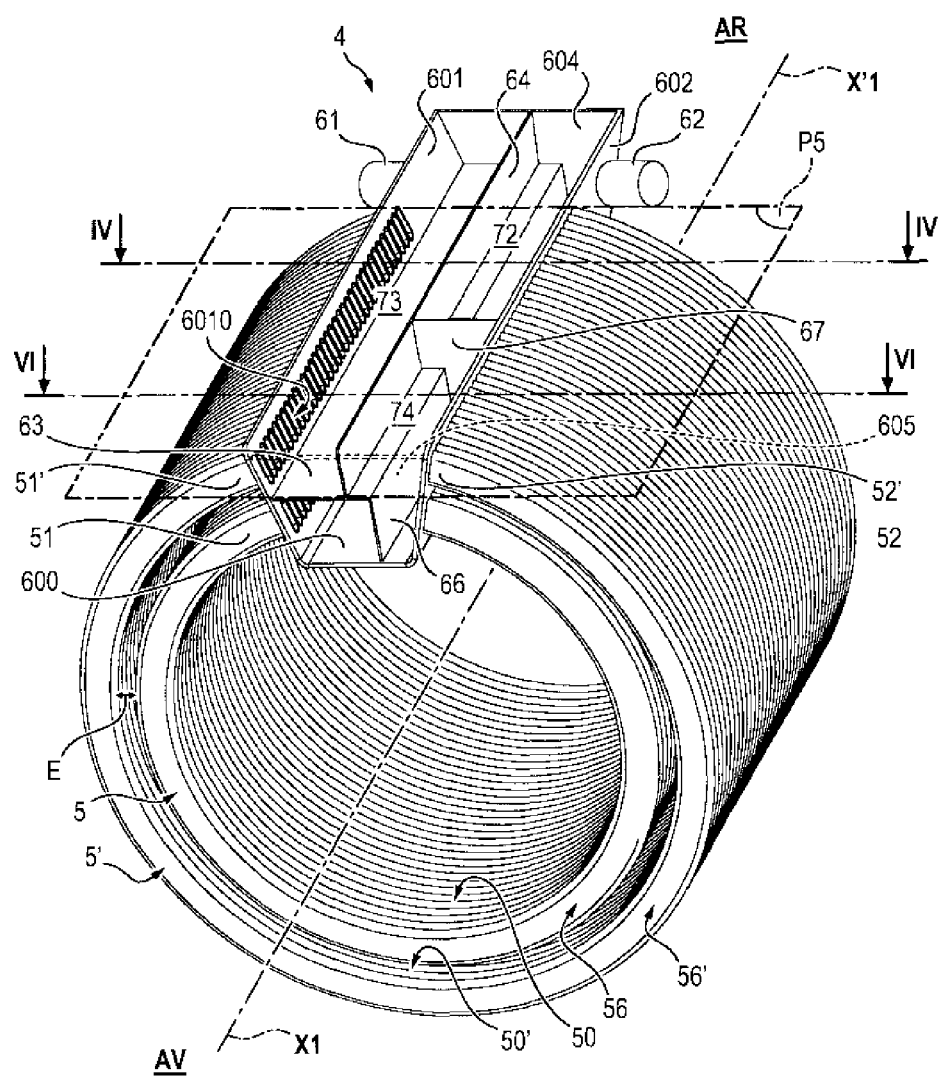
Figure 3:
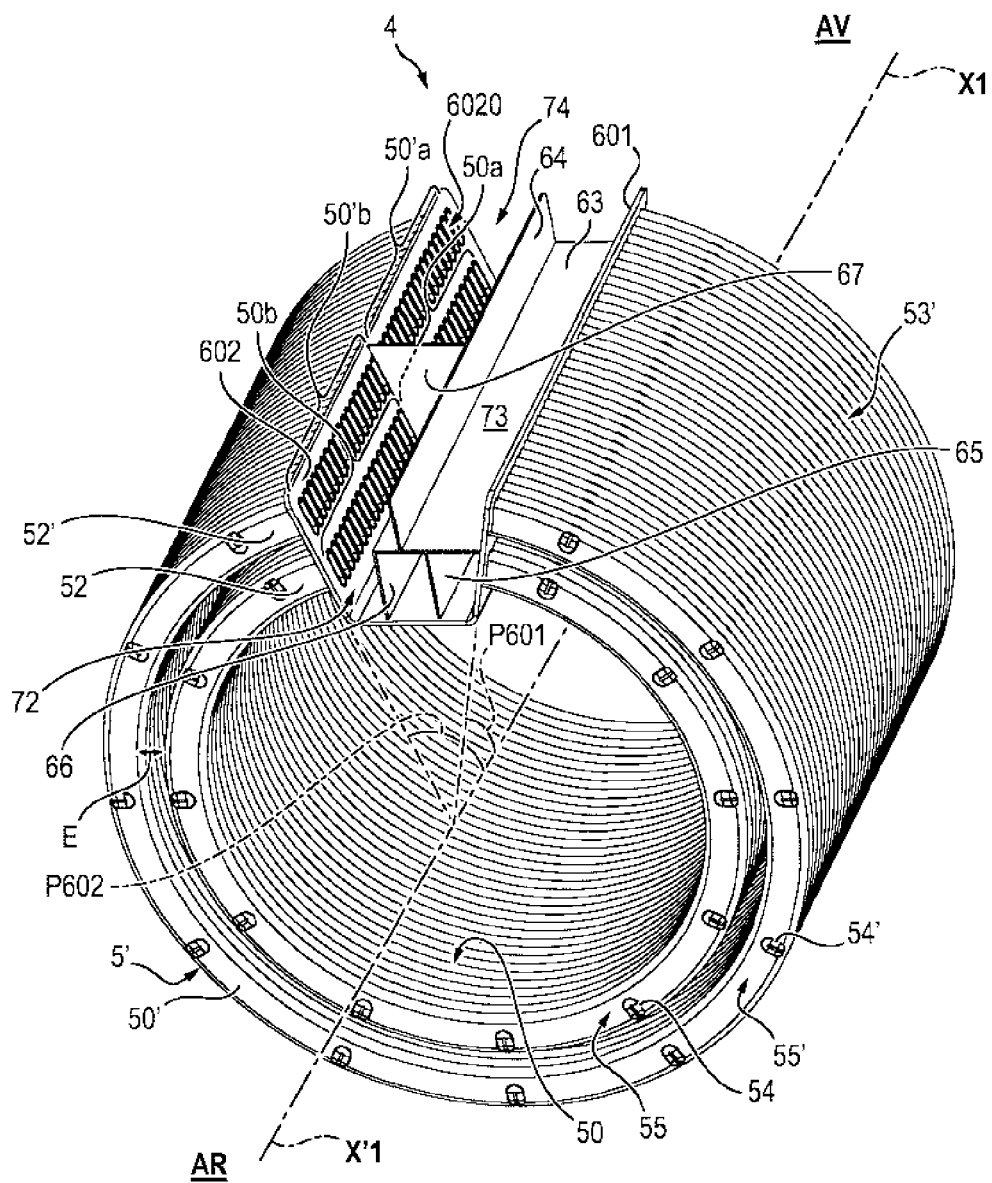
Figure 4:
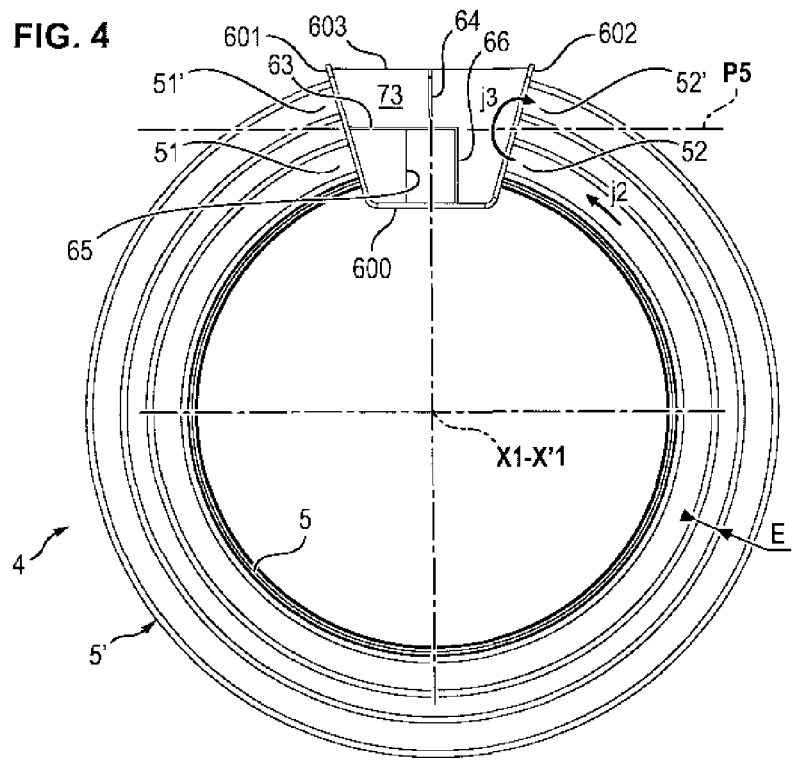
Figure 5:
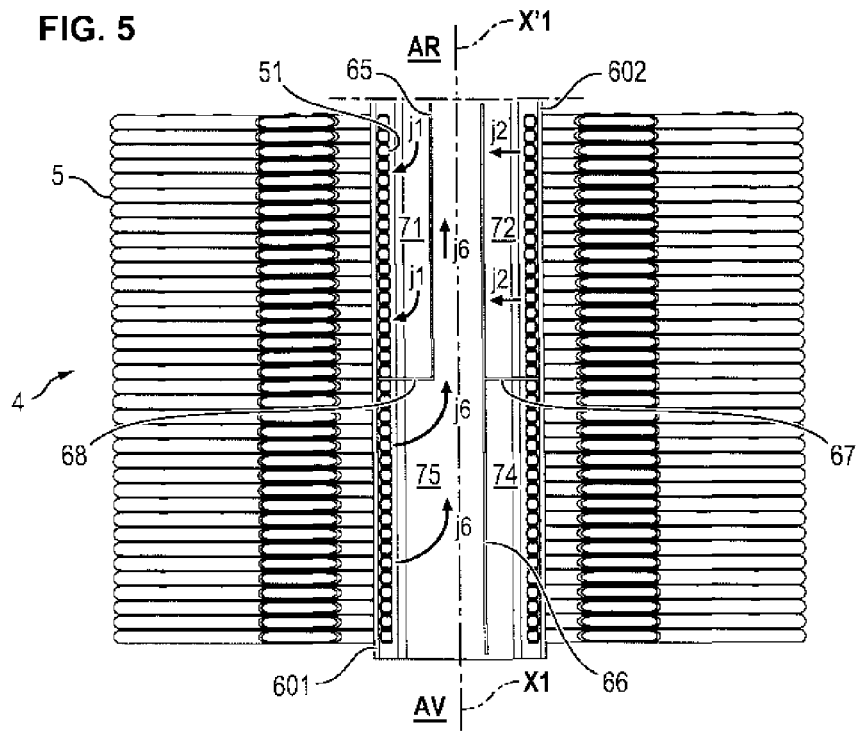
Figure 7:
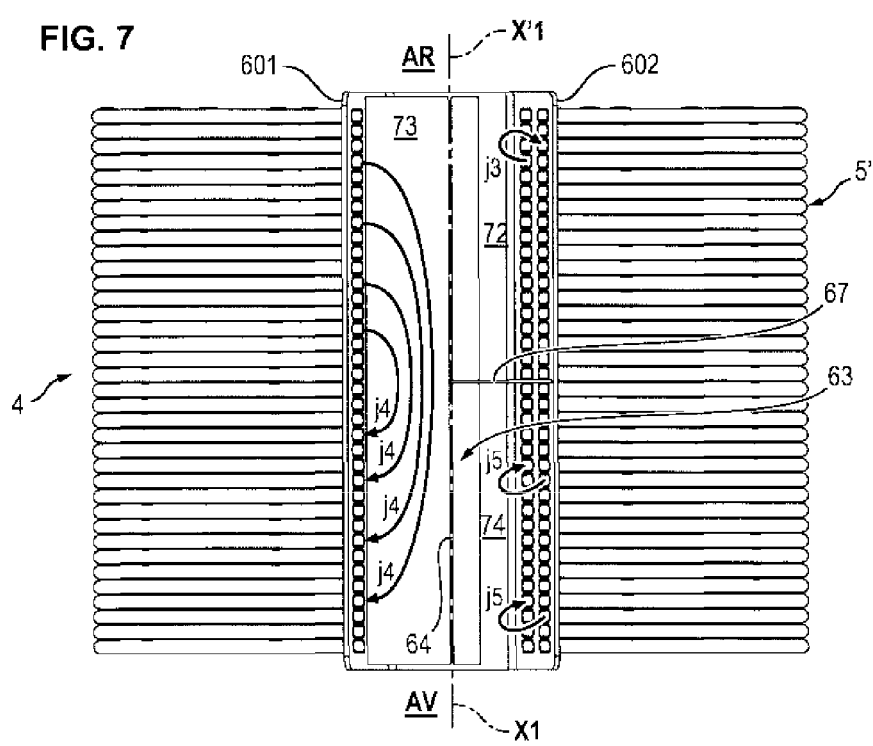
Figure 8:
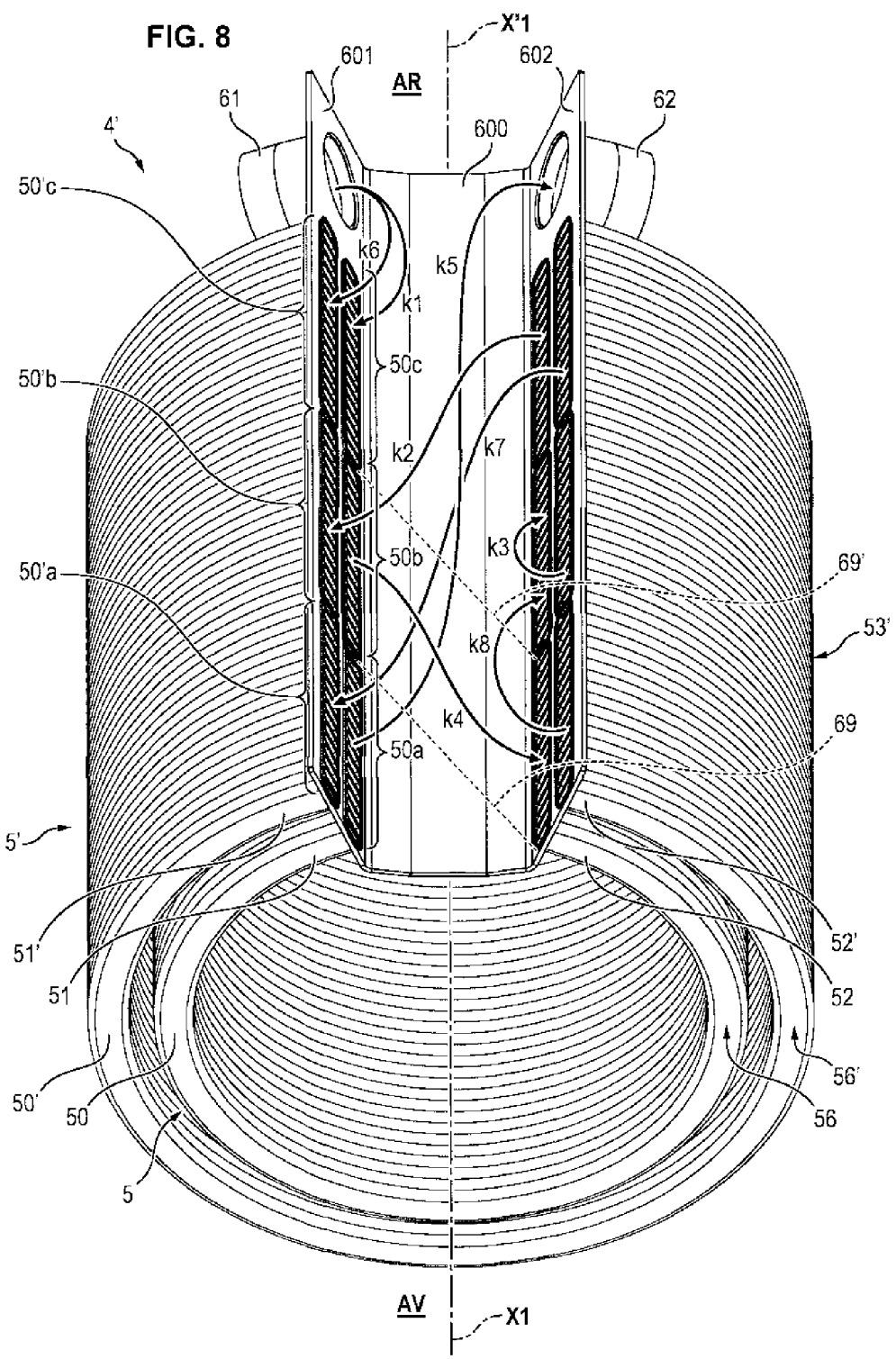
Figure 9:
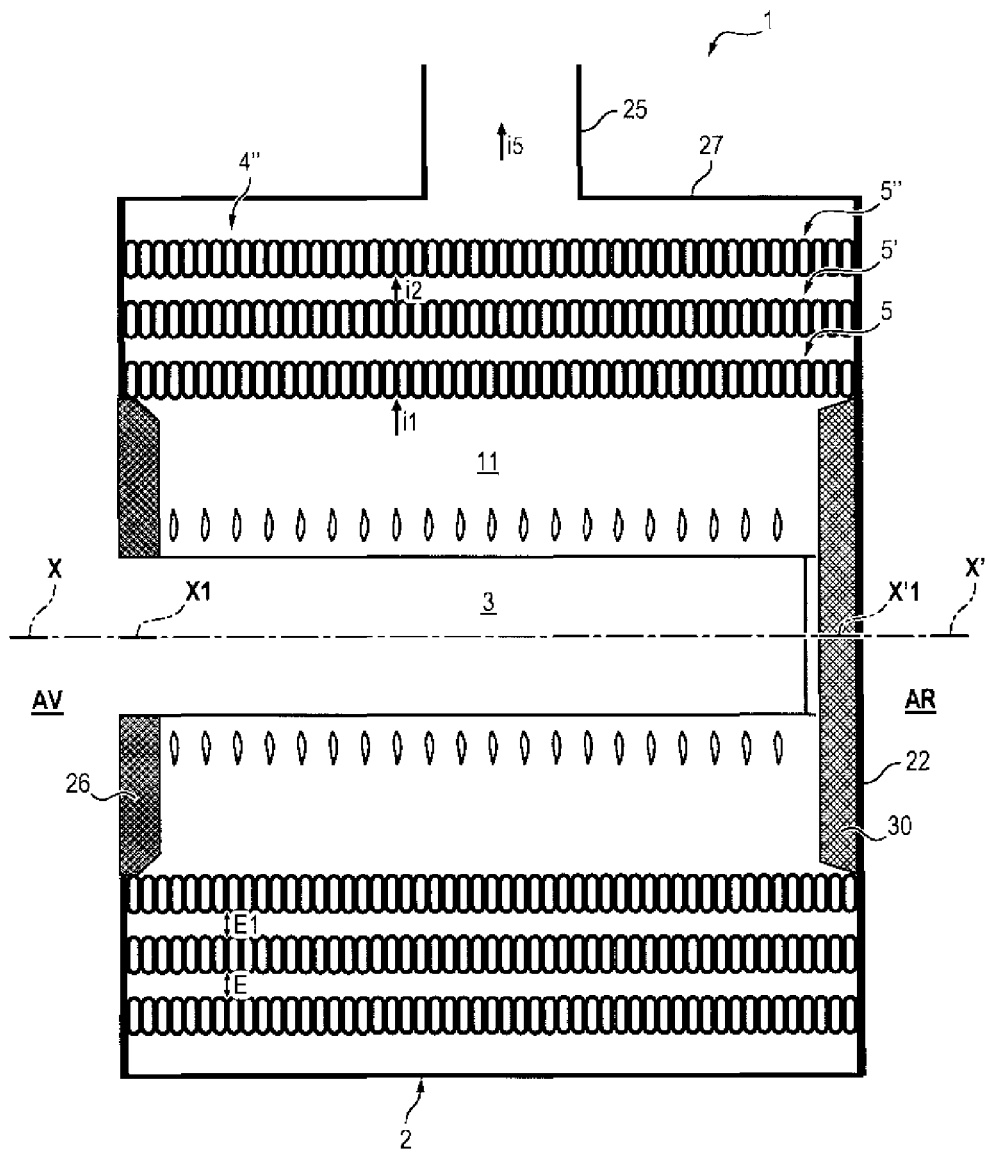
Figure 12:
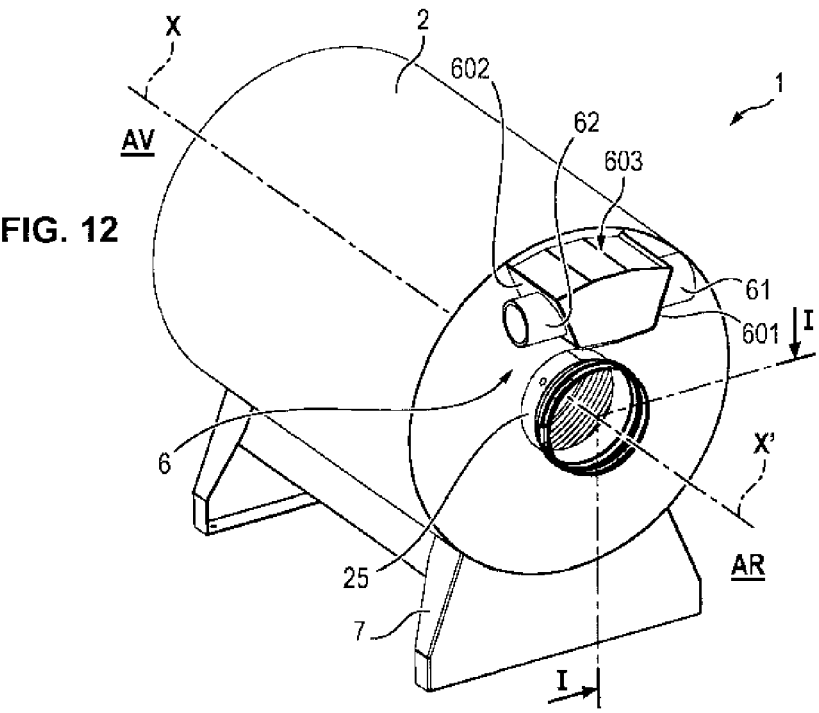
Figure 13:
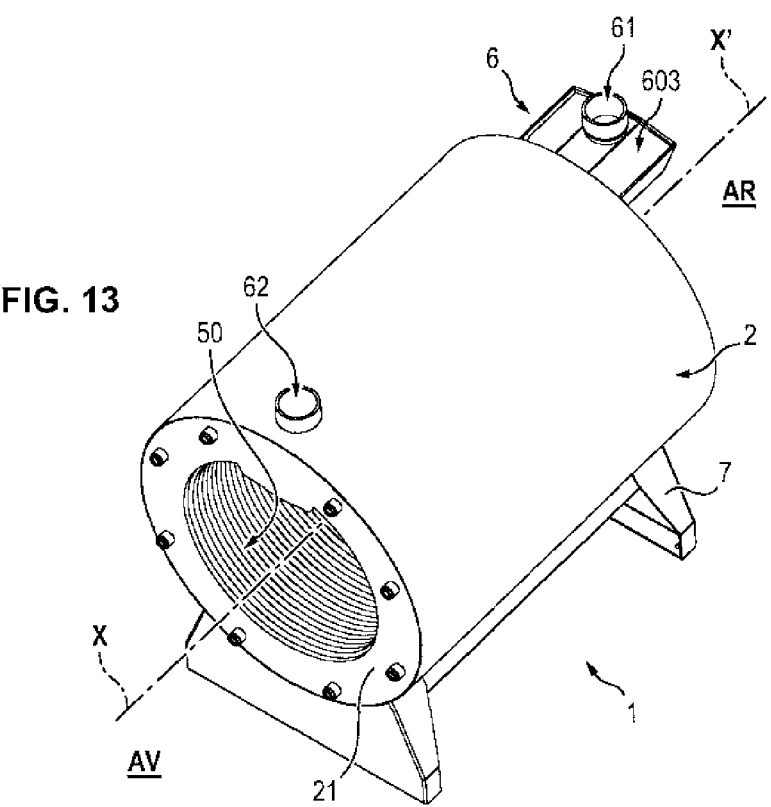
Figure 14:
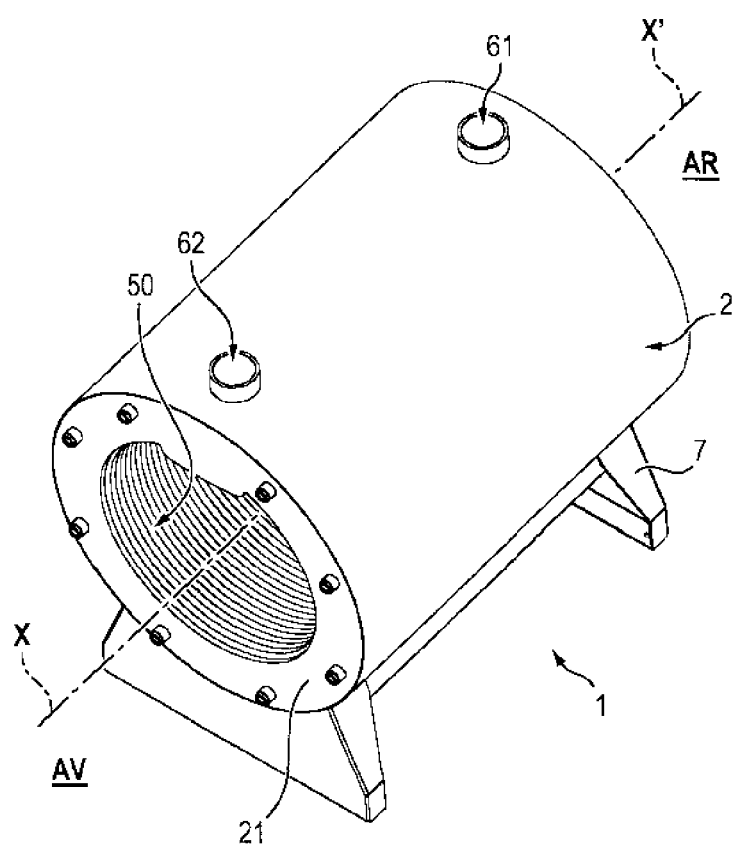
Figure 15:
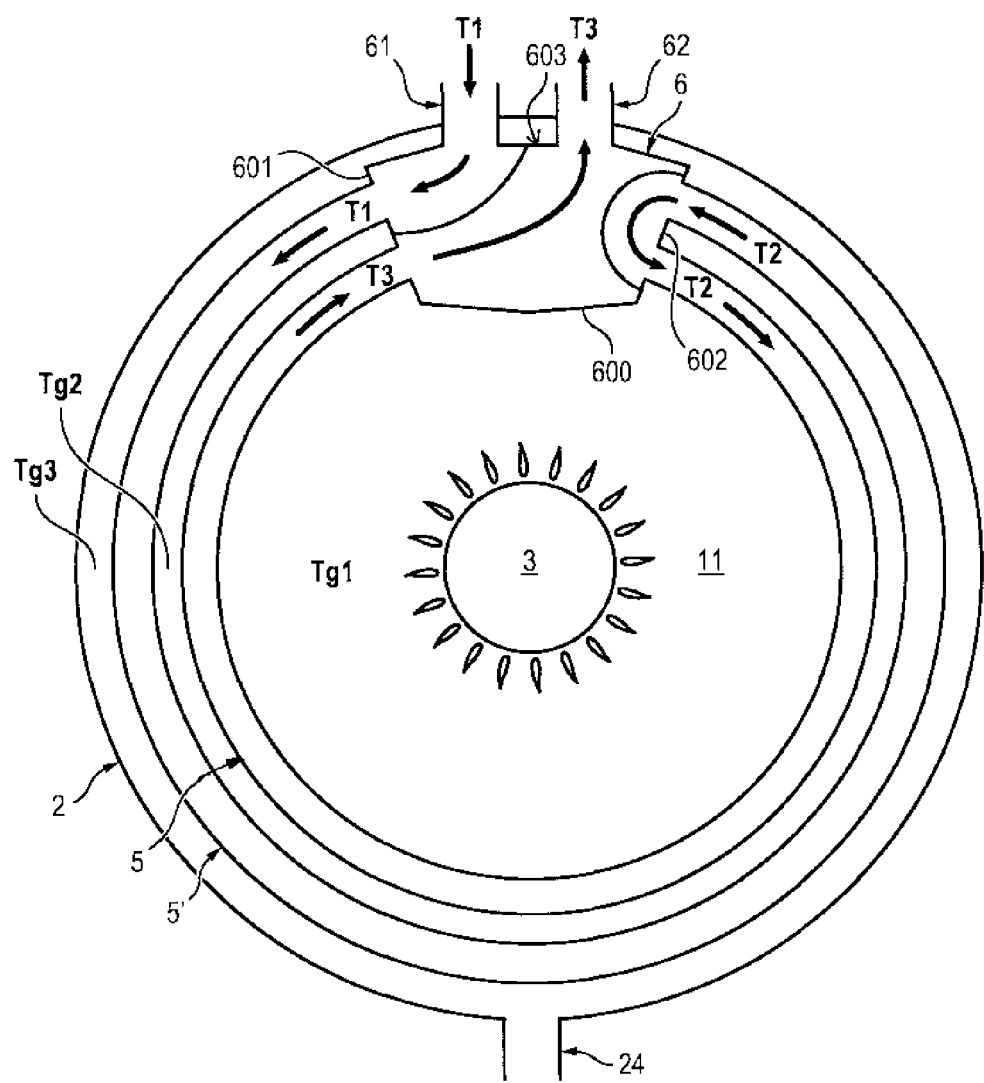
Figure 16:
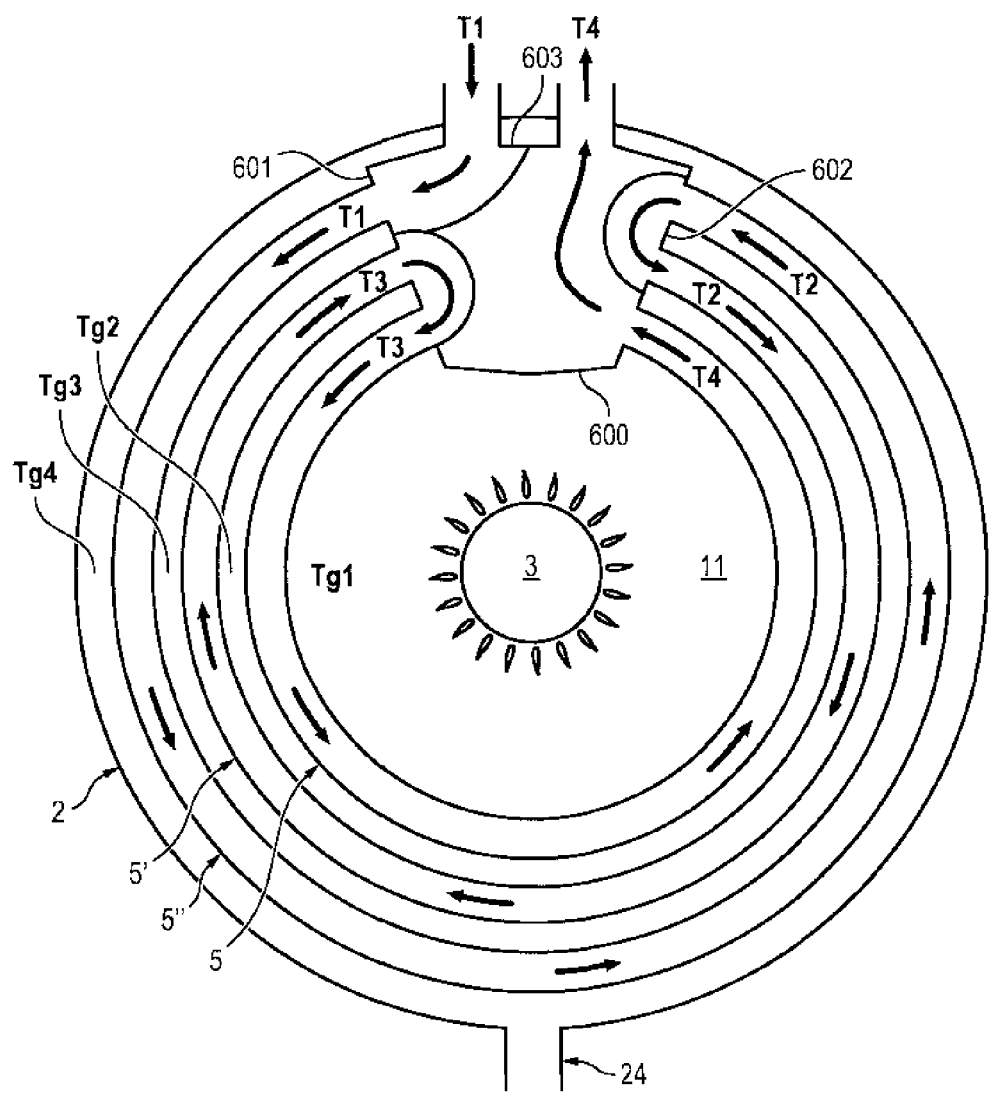

In these drawings:

FIG. 1 is a longitudinal section of a condensation heat exchanger conforming to a first embodiment of the invention, taken along the section line I-I of FIG. 12, FIGS. 2 and 3 are perspective views of a heat exchange device conforming to the invention, taken from two opposite viewing angles, the rear end of the collector having been truncated in FIG. 3, FIG. 4 is a cross section view of the heat exchange device of FIG. 2 taken along a section plane materialized by line IV-IV in FIG. 2, FIG. 5 is a longitudinal section view of the heat exchange device of FIG. 2 taken along section plane P5, FIG. 6 is a cross section view of the heat exchange device of FIG. 2 taken along a section plane materialized by line VI-VI, FIG. 7 is a top view of the heat exchange device of FIG. 2, FIG. 8 is a perspective view of another embodiment of a heat exchange device conforming to the invention, FIGS. 9, 10 and 11 are longitudinal section views of different other embodiments of condensation heat exchangers conforming to the invention, FIGS. 12, 13 and 14 are perspective views of three condensation heat exchangers shown without the burner, which differ as regards the position of the inlet and outlet connectors, FIG. 15 is a schematic view in cross-section of a heat exchanger conforming to the invention, the heat exchange device of which comprises two tube bundles, and FIG. 16 is a view similar to that of FIG. 15, but for a heat exchange device with three tube bundles.

DETAILED DESCRIPTION

Referring to the appended FIG. 1, a condensation heat exchanger 1 can be seen. It comprises a sealed gas-tight shell 2, which delimits an enclosure inside which are mounted hot gas production or hot gas conveying means 3 and a heat exchange device 4 conforming to the invention.

The shell 2 has approximately the general shape of a cylinder with a longitudinal axis X-X'.

This shell 2 is blocked at both ends by covers or fronts. Designated as "front face" is the face 21 oriented toward the front AV which is located to the left in FIG. 1, and as "rear face" the opposite face 22 which is located at the rear AR of the exchanger 1.

The shell 2 has a bottom 23, provided with an orifice 24 for discharging condensate.

The shell 2 also comprises a coupling (sleeve) 25 for discharging hot gases.

In the exemplary embodiment shown in FIG. 1, this coupling 25 is connected to the rear face 22. However, this disposition is not obligatory and in the embodiment of FIG. 9 it can be seen that the coupling 25 can be connected to the upper wall 27 of the shell 2.

The front face 21 has an opening 210 capable of receiving a thermally insulated door 26 which supports a burner 3. The burner 3 is for example a gas or fuel oil burner. It is preferably a cylindrical burner which extends along the longitudinal axis X-X'. This burner constitutes a direct means of producing hot gases.

Although that is not shown in the figures, it could however be replaced by means for conveying hot gases. These means allow the introduction of hot gases through the door 26 into the interior of the enclosure delimited by the shell 2, these hot gases being produced outside the shell 2.

The heat exchange device 4 which will subsequently be described in greater detail, also has a generally cylindrical shape with longitudinal axis X1-X'1. It is mounted inside the shell 2 so that its axis X1-X'1 is, coaxial with the longitudinal axis X-X' of the shell 2.

Finally, as can be seen in FIGS. 12 to 14, the shell 2 rests advantageously on a support 7.

A first embodiment of a heat exchange device 4 conforming to the invention will now be described in relation to FIGS. 2 to 7.

In this embodiment, the heat exchange device 4 comprises two tube bundles 5, 5', assembled together using a single collector 6, called a "mono-collector."

Each tube bundle 5, 5' comprises a series of tubes 50, respectively 50', made of material with good thermal conductivity, preferably metal, for example of stainless steel or aluminum.

A heat-transfer fluid, water for example, is designed to circulate inside the tubes 50, 50'.

Each tube 50, 50' has a circular arc shape wherein the center of the circle is situated on the longitudinal axis X1-X'1. These tubes are obtained by bending for example.

Each tube 50 has a first end 51 and a second, opposite end 52. Likewise, each tube 50' has a first end 51' and a second end 52'.

The two tube bundles 5 and 5' are disposed concentrically around the longitudinal axis X1-X'1, the bundle 5, called the "first bundle," being disposed inside the bundle 5', called the "second bundle." In other words, the first bundle 5 situated in the interior has an outer diameter smaller than the inner diameter of the second bundle 5'.

The two bundles 5 and 5' are thus spaced from one another by an interval E.

This concentric disposition allows a central space to be retained inside which is housed the burner 3.

In each bundle 5, 5', the circular-arc-shaped tubes 50, respectively 50', are disposed in parallel planes, these different planes themselves being perpendicular to the axis X1-X'1 and two adjacent tubes 50, (respectively 50') are spaced from each other by a gap with reference symbol 53, (respectively 53'). These gaps appear better in FIG. 1, for example.

Such gaps 53, 53' are advantageously of constant width.

According to a first variant, the tube bundles 5, 5' are disposed concentrically one inside the other so that their respective gaps 53, 53' are aligned in the same plane, as can be seen in FIGS. 1 and 9 to 11.

According to another variant not shown in the figures, it is also possible to dispose the concentric tube bundles 5, 5' while offsetting one by half a pitch with respect to the other, so that the tubes 50 of the bundle 5 face the gaps 53' provided between the tubes 50' of the bundle 5'.

Advantageously, each tube 50, 50' has an oval straight section flattened in the middle, so that it has two mutually parallel lateral flat faces which extend in planes perpendicular to the longitudinal axis X1-X'1 of these circular-arc-shaped tubes.

Said lateral flat faces of the tubes 50, 50' oriented toward the rear AR bear respectively reference symbols 55, 55'. They are visible in FIG. 3. The opposite lateral flat faces of the tubes 50, 50' turned toward the front AV, bear respectively reference symbols 56, 56'. They are visible in FIG. 2.

The gaps 53, 53' are defined by means of spacers constituted for example by bosses 54, 54' or corrugations formed on only one of these lateral flat faces, for example the rear face 55, respectively 55' of the tubes 50, 50', or on both faces 55, 56, 55', 56'.

Also advantageously, these bosses 54, 54' extend radially, that is along a radius of the circle of each of the circular-arc-shaped tubes 50, 50'.

Preferably, the bosses 54, 54' are uniformly distributed over the totality of the circumference of the circular arc. They are for example formed by hydroforming.

Finally, within each tube bundle 5, 5', a group of at least two adjacent tubes inside which the heat-exchange fluid circulates in parallel and in the same direction is designated a "group of tubes." In the embodiment shown in FIGS. 2 and 3, the first tube bundle 5 has two groups of tubes 50a, 50b, while the second bundle 5' has two groups of tubes with reference symbol 50'a and 50'b.

As appears better in FIGS. 2, 12 and 13, the sole collector 6, (or mono-collector) is an element having preferably substantially the shape of a parallelepiped, which comprises a bottom 600 oriented toward the axis X1-X'1, preferably flat, two lateral walls 601, 602, an exterior wall 603 and two end walls, respectively a rear wall 604 and a front wall 605, designated thus due to their orientation with respect to the front and rear of the shell 2 when the device 4 is in this shell.

The exterior wall 603 is not shown in FIG. 2, so as to be able to observe the interior of the collector 6, but is visible in FIGS. 4, 15, 16, and furthermore the front wall 605 appears only in dotted lines.

Advantageously, the collector 6 is also made in a material with good thermal conductivity, preferably of metal, for example of stainless steel or of aluminum. The collector 6 being housed in the shell 2, this favors heat exchanges with the hot gases.

Advantageously, the two lateral walls 601 and 602 are flared from the bottom 60 so that they extend in the radial planes P601, P602 of a cylinder with longitudinal axis X1-X'1. The rear 604 and front 605 walls are then substantially shaped as an isosceles triangle, so as to adapt themselves to the cross-section of the collector.

The lateral walls 601 602 are perforated with a plurality of openings 6010, respectively 6020, to which are connected the first ends 51, 51' of the tubes 50, 50' and respectively the second ends 52, 52' of the tubes 50, 50'. Thus, the tubes 50, 50' lead into the collector 6 and are in fluid communication with it.

The attachment of the tubes to the walls 601, 602 of the collector preferably occurs by welding, or crimping or tube expansion depending on the thickness of the walls.

The fact of having lateral walls 601, 602 which extend in the radial planes of a cylinder with axis X1-X'1 allows tubes 50, 50' to be used of which the cross sections of the ends 51, 52, 51', 52' are straight sections (that is perpendicular to the directrix of the tube). This simplifies the step of assembling tubes on the walls 601, 602.

However, the lateral walls 601 and 602 could also have a different orientation, be perpendicular for example to the bottom 600. The section plan of the ends 51, 52, 51', 52' would then be adapted as required.

The collector 6 is provided with an inlet connector 61 which allows it to be supplied with heat-transfer fluid (water) to be heated, and with an outlet connector 62 which allows the discharge of said fluid once heated.

In the exemplary embodiment shown in FIGS. 2 and 12, the inlet 61 and outlet 62 connectors are disposed at the rear end of the collector 6, the connector 61 leading into the collector through the wall 601 and the connector 62 through the wall 602.

Other dispositions are possible, however. Thus, the inlet 61 and outlet 62 connectors can be disposed at the rear or front end of the lateral walls 601 or 602, on the front face 605 or the rear face 604 or on the exterior face 603.

Furthermore, the portion of the collector 6 into which at least one of the connectors 61 and 62 leads, can protrude out of the shell 2 (see FIGS. 12 and 13) or not (see FIG. 14).

A plurality of partitions is also disposed in the interior of the collector 6, so as to define in its interior a plurality of channels.

These partitions play the role of deflectors, in that their role is to guide the flows of heat-transfer fluid while still reducing head losses.

These partitions are preferably made of the same material as the rest of the collector 6. These are advantageously made of thin sheet metal, welded together and/or to the walls of the collector. The different channels are thus sealed from one another.

The exemplary embodiment shown in FIGS. 2 to 7 will now be described. In this case, the collector 6 comprises a longitudinal horizontal partition 63, called "median" because it extends between the two tube bundles, interior 5 and exterior 5'. This partition 63 extends over the totality of the length of the collector 6, but over only a portion of its width (approximately two-thirds here) from the lateral wall 601.

Hereafter in the description and claims, the terms "horizontal" and "vertical" are to be take into consideration with respect to the orientation of the device 4 in FIG. 2.

Furthermore, the collector 6 also comprises an upper longitudinal vertical partition 64, which extends over the entire length of the collector 6, over only a portion of its height, namely the upper portion from the partition 63 toward the exterior (toward the upper wall 603).

The collector 6 also comprises two lower longitudinal vertical partitions 65, 66. The partition 65 extends over only a portion of the length of the collector 6 from the rear AR to half of it; it is disposed roughly at one-third the width of the collector. The longitudinal partition 66 extends over the entire length of the collector, roughly at the second third of its width. The partitions 65, 66 extend between the bottom 600 and the partition 63, perpendicular to it.

Finally, the collector 6 comprises a transverse vertical partition 67 which extends over the totality of the height of the collector 6, substantially to the middle of its length, from the bottom 600 to the upper wall 604 and over a portion of the width of the collector (from the lateral wall 602 to the partitions 64 and 66).

The collector 6 also comprises a second lower transverse vertical partition 68 which extends to the middle of the length of the collector, between the bottom 600 and the median partition 63. This partition 68 joins the partition 65.

The partitions 65, 63 and 68 form, with the bottom 600 and the lateral wall 601, a first channel with reference symbol 71. This channel 71 allows the inlet connector 61 to be put in fluid communication with the first ends 51 of the second group 50b of tubes 50 of the first bundle 5.

The partitions 64, 67 and 66 and a portion of the partition 63 delimit, with the bottom 600, the upper wall 604 and the lateral wall 602, on the rear of the collector 6, a second channel 72. This second channel 72 puts the second ends 52 of the second group 50b of tubes 50 of the first bundle 5 into communication with the second ends 52' of the second group 50'b of tubes 50' of the second bundle 5'.

The partitions 63 and 64 delimit, with the upper wall 604 and the lateral wall 601, a third channel 73 which extends over the entire length of the collector 6. This third channel 73 allows the first ends 51' of the second group 50'b of tubes 50' of the second bundle 5' to be connected with the first ends 51' of the first group 50'a of tubes 50' of this same bundle.

The partitions 64, 66, 67 and a portion of the partition 63 delimit, with the upper wall 604, the bottom 600 and the lateral wall 602, toward the front AV of the collector 6, a fourth channel 74. This fourth channel 74 puts the second ends 52' of the first group 50'a of tubes 50' of the second (exterior) bundle 5' in communication with the second ends 52 of the first group 50a of tubes 50 of the first interior bundle 5.

Finally, the partitions 63, 66, 65 and 68 delimit with the bottom 600 and the front portion of the lateral wall 601, a fifth channel 75 which extends from one end of the collector 6 to the other, having a greater width toward the front and narrowing toward the rear AR. This fifth channel 75 allows the first ends 51 of the first group 50a of tubes 50 of the first interior bundle 5 to be put into communication with the outlet connector 62.

The path of the gases will now be described in connection with FIG. 1.

In the exemplary embodiment shown in FIG. 1, a disk of thermal insulation 30 is mounted in the interior of the heat exchange device 4, perpendicular to its axis X1-X'1, so as to block the center of the first bundle 5.

It extends facing the burner 3. It comprises at its periphery a radial deflector ring 31 which is inserted in a gas-tight manner into one of the gaps 53 of the first tube bundle 5 and into one of the gaps 53' of the second bundle 5', while leaving a free annular space 28 between the exterior of the second bundle 5' and the shell 2, forcing the smokes to pass through space 28.

This disk of thermal insulation 30 and the deflector 31 thus allow separating the shell 2 of the exchanger 1 into a combustion chamber 11, inside which are located means of conveying or producing hot gases 3 and a condensation chamber 12 extending between this disk of thermal insulation 30 and the gas discharge coupling 25, it being understood that depending on the operating regime, condensation can also occur in the combustion chamber.

Such a disposition is not obligatory, however. Thus one can see shown in FIG. 9 another embodiment, wherein the thermal insulation disk 30 can be disposed in proximity to the rear face 22, the gas discharge coupling 25 being then provided in the upper wall 27 of the shell 2. Such a heat exchanger then comprises only a single chamber which serves as a combustion chamber 11.

The hot gases which escape from the burner 3 pass radially through from the interior to the exterior, first of all the gaps 53 between the tubes 50 of the first bundle 5 (arrows i1), then the gaps 53' between the tubes 50' of the second bundle 5' (arrows i2). They are guided this way due to the presence of the disk of thermal insulation 30 and the deflector 31.

The flow of very hot gases thus comes into contact with a relatively extended surface of the wall of the tubes and, by "licking" it (by being in contact with it), thus ensures a very effective heat transfer with the fluid to be heated which circulates inside these tubes. The more the hot gases move away radially toward the exterior, the more they are cooled, but nevertheless contribute to heat exchange with each tube bundle that they pass through.

When the hot gases come against the wall of the shell 2 in the space 28, they are then guided toward the rear (arrows i3), move into the condensation chamber 12, then pass radially, this time from the exterior to the interior, through the gaps 53' between the tubes 50' of the second bundle 5' (arrows i4), then the gaps 53 between the tubes 50 of the first bundle 5 (arrows i5), before escaping through the gas discharge coupling 25 (arrows i6).

In the variant embodiment shown in FIG. 9, the hot gases escape in only a single direction, namely radially from the interior toward the exterior, in the direction of the shell and of the gas discharge coupling 25.

The circulation of the fluid to be heated, such as water, will now be described in connection with FIGS. 2 to 7. The water is put into circulation using means such as a pump (not shown).

The cold water penetrates into the inlet connector 61, passes through the first channel 71 (arrows j1), circulates in the second group 50b of tubes of the first exchanger 5 and leaves it at its other end in the channel 72 (arrows j2). From there, the water leaves again in the second group 50'b of tubes of the second bundle 5' (arrows j3) and leaves it at their first ends 51' in the third channel 73. The water is thus preheated by crossing the cooled gases which circulate in the gaps 53, 53'.

The water leaves again through the tubes of the first group 50'a situated toward the front of the exterior bundle 5' (arrows j4), flows through these tubes and leaves them in the fourth channel 74. In this one, the water rejoins the first group 50a of tubes 50 of the interior bundle 5 (arrows j5), then leaves it to lead into the interior of the channel 75 in its front portion. The water is finally directed toward the rear portion of this channel to the outlet connector 62 (arrows j6).

It is thus understood that the fluid to be heated can circulate between the inlet connector 61 and the outlet connector 62, having passed through all the tubes of the different bundles constituting the device 4.

The hot gases circulate counter-flow to circulation of the fluid to be heated, which allows condensing operation.

In other words, the second group 50b of tubes 50 of the first (interior) bundle 5 and the second group 50'b of tubes 50' of the second (exterior) bundle 5' are situated facing the condensation chamber 12, while the first group 50a of tubes 50 of the first bundle 5 and the second group 50'a of tubes 50' of the second (exterior) bundle 5' are situated facing the combustion chamber 11.

Thus, tube assembly of the exterior bundle 5' situated facing the combustion chamber 11 is fed with heat-transfer fluid before all the tubes of the interior bundle 5 are.

It is easily understood that by using a varied number of partitions, by disposing them over all or a portion of the length, of the height and of the width of the collector 6, it is thus possible to create different groups of tubes to cause the fluid to be heated to travel along the desired path in the interior of the tube bundles, this path being adjusted and adapted according to the power and the efficiency that it is desirable to obtain with the heat exchange device 4, while still having minimum head losses and avoiding any risk of overheating.

It will be noted that, when there is a combustion chamber 11 and a condensation chamber 12, this insulation disk 30 can be located facing the zone situated between two adjacent groups of tubes or, on the contrary, be located facing a given group of tubes, between two adjacent tubes of this group, provided that in this second case the circulation of the fluid occurs first in the tubes of the exterior bundle before those of the interior bundle.

A second embodiment of the invention will now be described in connection with FIG. 8.

In this figure can be seen a heat exchange device 4' which differs from the device 4 describe previously in connection with FIGS. 2 to 7, by the fact that it comprises three groups of tubes in each bundle, instead of two.

The same elements as those previously described bear the same numerical reference symbols. The three groups of tubes have reference symbols 50$a$, 50$b$ and 50$c$ for the first interior bundle 5 and, respectively, 50'$a$, 50'$b$ and 50'$c$ for the second exterior bundle 5'.

In this figure, only two diagonal partitions 69, 69' have been shown schematically by dotted lines and the other partitions present in the interior of the collector 6 have not been shown for the purpose of simplification. However, the path of the fluid to be heated in the interior of this collector will now be described.

The fluid to be heated penetrates into the inlet connector 61, separating into two flows when it leaves it (arrows k1 and k6), which supply respectively the first ends 51 of the third group of tubes 50$c$ of the interior bundle 5 and the first ends 51' of the third group of tubes 50'$c$ of the second exterior bundle 5'.

The flows materialized by the arrows k1 and k6 leave the tubes 50 respectively at the second ends 52 of the third group 50$c$ of tubes and at the second ends 52' of the third group 50'$c$ of tubes, they are mixed, and they are directed diagonally respectively toward the first ends 51' of the second group of tubes 50'$b$ and of the first group of tubes 50'$a$ of the second exterior bundle 5' (arrows k2 and k7) and leave by their second ends 52'.

The flows which leave them then both penetrate into the second ends 52 of the second group 50$b$ of tubes of the interior bundle 5 (arrows k3 and k8). The flow of liquid circulates in the interior of the tubes 50 and leaves them by their first ends 51.

The flow leaving these first ends 51 is then directed diagonally toward the second ends 52 of the first group 50$a$ of tubes of the first bundle 5 (arrow k4). After having circulated in the interior of the tubes 50, the fluid leaves by their first ends 51 to then be directed toward the outlet connector 62 (arrow k5).

According to a variant embodiment shown in FIG. 14, the inlet connector 61 is situated on top of the collector and the exchanger and toward the rear, and the outlet connector 62 on top and toward the front. In this case, the flows k1 and k6 originate from the top of the collector and the flow k5 is discharged toward the top and toward the front of the collector.

Thus it can be seen that, in this case, certain partitions can be diagonal, when the purpose for example is to connect the first ends of a given group of tubes, for example the first group of tubes, to the second ends of the second or third group of tubes. The diagonal partitions 69, 69' are thus neither parallel to the longitudinal axis X1-X'1, nor perpendicular to it. The diagonal partitions have the advantage of significantly reducing head losses in the collector.

Furthermore, it is observed that it is also possible to connect first ends of a group of tubes of one of the bundles to second ends of a group of tubes of another bundle. To accomplish this, it is necessary to use inclined, i.e. not parallel to the bottom 600, partitions.

It is also possible to connect one group of tubes with several groups of tubes.

Just as described for the preceding embodiment, the hot gases circulate counter-flow to the circulation of the fluid to be heated. In other words, the third groups of tubes 50$c$ of the interior bundle 5 and 50'$c$ of the interior bundle 5' (see FIG. 8) are disposed facing the condensation chamber 12 while the second groups of tubes 50$b$, 50'$b$ and first groups of tubes 50$a$, 50'$a$ are disposed facing the combustion chamber 11.

Thus, all the tubes (groups 50'$a$ and 50'$b$) of the exterior bundle 5' situated facing the combustion chamber 11 are supplied with heat-transfer fluid before all the tubes (group 50$b$ then group 50$a$) of the interior bundle 5 are.

The technical effect of the arrangement of channels on the circulation of the heat-transfer fluid in the devices 4, 4' in the combustion chamber 11 will now be explained in connection with FIG. 15.

The heat-transfer fluid enters at a temperature T1 into the exterior bundle 5', leaves it at a temperature T2 greater than T1, penetrates into the interior bundle 5 at T2 and leaves it at a temperature T3 greater than T2. At the same time, the hot gases leaving the burner 3 at Tg1 are cooled to temperatures Tg2 lower than Tg1, then to Tg3 lower than Tg2 after passage through the gaps of the tubes of the two bundles 5, 5'.

Thus for example, to produce water at T3 on the order of 50° C., from water at a temperature T1 equal to 30° C., the temperature T2 will be on the order of 35° C. At the same time, the hot gases produced by the burner 3 will pass from a temperature Tg1 of approximately 1000° C. to a temperature Tg2 of approximately 130° C. then to a temperature Tg3 of approximately 35° C. Thanks to the features of the invention, a net cooling of the hot gases is observed through the different bundles of tubes. The cold water penetrating first of all into the exterior tube bundle 5', the temperature Tg3 is considerably reduced compared with what was the case with devices of the prior art.

Likewise, for example, for producing water at T3 equal to 95° C. from water at a temperature T1 of 80° C., the temperature T2 will be close to 84° C. approximately. In this case, the temperatures Tg1, Tg2 and Tg3 will be respectively 1000° C., 180° C. and 85° C. approximately. Thus, such a device allows water to be produced at 95° C. but without there being any region of the heat exchange device 4 where water boils.

Another embodiment of the invention will now be described with reference to FIG. 9.

This embodiment differs from the two described previously in that the heat exchange device 4" comprises a third bundle 5" of tubes 50" concentric with the two others and disposed at the exterior of the second bundle 5'. The second and third bundles 5', 5" are spaced apart by an interval E1, which can be identical or different from the existing interval E between the first and second bundles. The gaps between the tubes 50" are given the reference symbol 53". The ends of the tubes 50" are not visible in 9.

The technical effect of this arrangement with three concentric tube bundles is shown schematically in FIG. 16. The hot gases leaving the burner 3 at a temperature Tg1 are cooled to temperatures Tg2 lower than Tg1, then to Tg3 lower than Tg2 and finally to Tg4 less than Tg3, after passage through the gaps of the tubes of the three bundles 5, 5' and 5".

The heat-transfer fluid circulates first exclusively in the tubes of the outermost bundle 5". It penetrates there at a temperature T1 and leaves it at a temperature T2 greater than T1. It then penetrates into the intermediary bundle 5' at a temperature T2, leaves it at a temperature T3 greater than T2, and finally enters the interior bundle 5 at a temperature T3 and leaves it at a temperature T4 greater than T3.

Thus, for example, to produce water leaving at a temperature T4 of 50° C., from water entering at a temperature T1 of 30° C., it is noted that the temperatures T2 and T3 are respectively on the order of approximately 34° C. and 38° C. At the same time, the hot gases produced at Tg1 (near 1000° C.) are cooled to temperatures Tg2 (near 140° C.), Tg3 (near 60° C.) and finally Tg4 (near 32° C.). Once again, the departing gases are at a temperature below the dew point, so that they condense and this allows a maximum of heat to be recovered to heat the heat-transfer fluid, all with a very good thermal efficiency of the exchanger.

Likewise, to produce water at a temperature T4 of 95° C., from water at a temperature T1 of 80° C., it is noted that the temperatures T2 and T3 are respectively 81° C. and 88° C. approximately. The hot gases produced at Tg1 (1000° C.) pass respectively to Tg2 (approximately 190° C.), Tg3 (approximately 105° C.) and finally Tg4 (approximately 82° C.).

Again, micro-boiling is not observed, particularly in the interior tube bundle 5.

Finally, in FIGS. 15 and 16, it is noted that the partitions delimiting the different channels can also be curved, that is have a cross section (taken in a plane perpendicular to X1-X'1) with a bent shape.

Finally, the two embodiments shown in FIGS. 10 and 11 differ from the embodiment of FIG. 9, in that the tube bundles are not all of the same length. Thus, in the embodiment of FIG. 10, the third bundle 5" of tubes is shorter than the two other bundles 5 and 5', so that there are three tube bundles facing the combustion chamber 11 and only two facing the condensation chamber 12.

Conversely, in the example shown in FIG. 11, it is the first bundle 5 which is shorter than the other bundles 5' and 5".

It is easily understood that other embodiments can be considered by varying the number of bundles, which must be two at least, and by using bundles of different or identical lengths.

Likewise, by varying the shape, the length, the height, the width the disposition and the inclination of the different partitions positioned in the interior of the collector 6, it is possible to form groups of tubes having more or fewer tubes, to create different paths between the inlet connector and the outlet connector and thus to obtain heat exchange devices having differences in power, compactness in length or in diameter, efficiency or head losses (pressure losses).

Generally, when it is desired to improve the power of the exchanger 1, it is possible to increase at the choice the number of tubes per bundle, the dimensions of the cross-section of the tubes, the diameter of the bundles and/or the number of bundles.

To increase efficiency, that is the ratio between the quantity of energy produced with respect to the quantity of energy supplied, it is possible, for a given power, to operate on the aforementioned parameters and/or to increase the number of tubes in the condensation portion.

Furthermore, the mono-collector 6 allows head losses to be reduced with respect to circulation in a helical tube, because it allows the heat-transfer fluid to circulate in parallel in all the tubes of the same group. It also allows the flows of heat-transfer fluid to be directed and shared between the bundles to reduce head losses and avoid overheating.

The invention claimed is:

1. A heat exchanger, comprising:
a gas-tight shell, delimiting a combustion chamber, said shell including a gas discharge coupling,
a heat exchange device for circulating a to be-heated heat-transfer fluid, the heat exchange device being mounted fixedly in an interior of the shell,
said heat exchange device comprising:
a first interior tube bundle, and at least one other bundle of tubes, the first interior tube bundle being disposed closer to a central location of the heat exchange device than the at least one other tube bundle and the at least one other bundle of tubes being disposed concentrically around the first interior tube bundle, all tubes of all bundles being made of a thermally conductive material and being configured to circulate fluid therein, each bundle of tubes comprising a series of tubes each of which has the shape of a circular arc and has a first end and a second end, the tubes of each bundle being disposed in parallel planes with a gap between two adjacent tubes,
a single collector, made of a thermally conductive material, delimited by walls, a first end and a second end of each tube of the different bundles being connected to the collector, so that they lead inside said collector,
the collector being provided with an inlet connector allowing the collector to be supplied with heat-transfer fluid to be heated and with an outlet connector allowing the discharge of said fluid once heated,
means for producing hot gases in the combustion chamber of said shell, said means for producing hot gases being disposed in the vicinity of said heat exchange device, so that the hot gases pass radially through the different concentric bundles of tubes, from the interior to the exterior, by passing through the gaps provided between said tubes, before being discharged outside the heat exchanger, through said discharge coupling,
wherein the heat exchanger is a condensation heat exchanger,
wherein the shell comprises a condensation chamber, fewer than all the tubes of the interior tube bundle and fewer than all the tubes of the at least one other bundle being disposed in said condensation chamber, and the remaining tubes of the interior tube bundle and of the at least one other bundle being disposed in the combustion chamber,
wherein said collector comprises several interior partitions, welded together and to the walls of the collector, and wherein the partitions delimit different channels, which are arranged to cause the fluid to be heated to circulate from said inlet connector, through all the tubes, to the outlet connector where the fluid once heated is discharged, the circulation being carried out through different groups of at least two tubes of each successive bundle,
wherein the channels are also arranged so that, inside the tubes located in the combustion chamber, the circulation of the fluid is carried out through the different groups of at least two tubes of each successive bundle, successively, bundle by bundle, from the outermost bundle to the interior bundle,
wherein said inlet connector is put into communication with a first end or a second end of at least one group of at least two tubes, exclusively of the remaining tubes of the outermost bundle which are disposed inside the combustion chamber, through at least one channel of said collector and through the tubes of the interior bundle and the tubes of the at least one other bundle located in the condensation chamber, and
wherein the collector comprises at least one channel which allows a first end or a second end of at least one group of at least two tubes, exclusively of the remaining tubes of the interior bundle which are disposed inside the combustion chamber, to be put into communication with said outlet connector.

2. The heat exchanger according to claim 1, wherein the collector comprises a bottom, an exterior wall, a rear wall, a front wall and two lateral walls through which the first and the second ends of the tubes of the different bundles lead inside the collector and in that the lateral walls extend in radial planes of a cylinder, a longitudinal axis of which passes through centers of each of the different circular-arc-shaped tubes.

3. The heat exchanger according to claim 1, wherein the tubes of said bundles have a flattened oval straight section so that they comprise two mutually parallel lateral flat faces perpendicular to a longitudinal axis connecting the centers of each of the circular-arc-shaped tubes.

4. The heat exchanger according to claim 1, wherein the partitions which delimit the different channels extend in the collector longitudinally, transversely and/or diagonally.

5. The heat exchanger according to claim 1, wherein the partitions which delimit the different channels extend over a portion or over the totality of the height, the width and the length of the collector.

6. The heat exchanger according to claim 1, wherein the partitions which delimit the different channels are curved.

7. The heat exchanger according to claim 1, wherein the gap between two adjacent tubes of each bundle of tubes is calibrated by spacers.

8. The heat exchanger according to claim 7, wherein said spacers are bosses or corrugations, formed in the wall of a tube, facing the wall of an adjacent tube of the same bundle.

9. The heat exchanger according to claim 1, wherein the heat exchanger comprises means for causing said heat-transfer fluid to circulate in the tubes.

10. The heat exchanger according to claim 1, wherein the means of producing hot gases are a gas or fuel oil burner.

11. The heat exchanger according to claim 2, wherein the tubes of said bundles have a flattened oval straight section so that they comprise two mutually parallel lateral flat faces perpendicular to the longitudinal axis connecting centers of each of the circular-arc-shaped tubes.

12. The heat exchanger according to claim 2, wherein the partitions which delimit the different channels extend in the collector longitudinally, transversely and/or diagonally.

13. The heat exchanger according to claim 2, wherein the partitions which delimit the different channels extend over a portion or over the totality of the height, the width and the length of the collector.

14. The heat exchanger according to claim 2, wherein the partitions which delimit the different channels are curved.

15. The heat exchanger according to claim 2, wherein the gap between two adjacent tubes of each bundle of tubes is calibrated by spacers.

16. The heat exchanger according to claim 15, wherein said spacers are bosses or corrugations, formed in the wall of one of said tubes, facing the wall of an adjacent tube of the same bundle.

17. The heat exchanger according to claim 2, wherein the heat exchanger comprises means for causing said heat-transfer fluid to circulate in the tubes.

18. The heat exchanger according to claim 2, wherein the means of producing hot gases are a gas or fuel oil burner.

* * * * *